Patented Apr. 14, 1942

2,279,438

UNITED STATES PATENT OFFICE 2,279,438

RESINOUS COMPOSITION

Walter D. Bowlby, Allentown, Pa., assignor to Trojan Powder Company, Allentown, Pa.

No Drawing. Application September 27, 1938, Serial No. 231,933

5 Claims. (Cl. 260—16)

This invention relates to a composition of matter comprising a resin of special kind modified by nitrostarch and, particularly, to such a composition for use as a lacquer. More specifically, the invention relates to such a composition in which the resin present is strength-increasing and convertible to a hardened condition at a temperature of approximately 120° C. or lower.

The use of nitrostarch in lacquer, of the general class now known as the nitrocellulose or pyroxylin type, was first suggested many years ago and modifications of this early disclosure have formed the subject matter of numerous patents issued from time to time over a long period of years.

Nitrostarch is less costly per pound than pyroxylin. It has the additional advantage from the standpoint of economy of not requiring special treatment subsequent to nitration and stabilization, to lower the viscosity for use in lacquer.

In spite of these important advantages over pyroxylin and of the numerous attempts to use nitrostarch in lacquer, this use of nitrostarch has been negligible, presumably due chiefly to the unsatisfactory strength and durability of lacquer films containing nitrostarch intsead of pyroxylin. Heretofore, nitrostarch films were characterized by brittleness and weakness. Frequently they crack even during evaporation of the solvent of the solution from which the films are being formed.

I have now discovered resin and nitrostarch compositions that obviate these difficulties. In fact, films resulting from the use of my compositions as lacquer have greater strength than corresponding films from which either the resin or the nitrostarch is omitted. Thus, I have made lacquer films having in hardened condition breaking strength as high as 200 to 300 kg. per square cm. and consisting largely of a convertible resin and nitrostarch, each of which alone when tested under comparable conditions has much lower strength. The lacquer is quick drying. The resulting film is highly satisfactory in durability on outdoor exposure.

To obtain these results, it is necessary to select a special type of resin for use with the nitrostarch. The resin selected should be an alkyd convertible in the presence of nitrostarch at relatively low temperatures. That is, the resins are hardenable in the presence of air at average atmospheric temperatures and rather quickly at approximately 120° C., to a relatively firm resinous form substantially harder than produced by simple evaporation therefrom of solvent in which the resin may have been temporarily dissolved. The resin should be soluble in usual lacquer solvent media and compatible with the nitrostarch in the finished lacquer films, so as to remain homogeneously blended with the nitrostarch after evaporation of the solvent. Also, the resin should be free from any appreciable amount of unreacted acid that may have been used in the manufacture of the resin and from other ingredients that, if present, would induce excessive corrosion of metal to which a lacquer containing the resin may be applied. Finally, the resin should be a strength-increasing resin. By "strength-increasing resin," as used herein, is meant a resin having the property of entering into a relationship with nitrostarch of such a nature that the maximum tensile strength of the composition in film form is in excess of that of either of the component materials in the absence of the other and in excess of 50 kilograms per square centimeter of cross sectional area of film, as tested by the method hereinafter described. Generally the resin employed will give a composition with nitrostarch of maximum tensile strength within the range of 10 to 50 parts of nitrostarch to 100 parts of combined weight of nitrostarch and resin.

The invention will be illustrated more specifically by detailed reference to the use of modified alkyd resins, the modifying agent being a drying oil acid or a urea-aldehyde composition, both of which modifying agents give alkyd resins which are convertible and strength-increasing.

The particular ratio of nitrostarch to resin will vary widely depending on the properties desired in the product. For the purpose of increasing the rate of drying of a film consisting largely of the resin, I may use as little as a few per cent, say three to six per cent of nitrostarch on the combined weight of nitrostarch and resin. For films having great strength and durability, the proportion of nitrostarch should not exceed the proportion of resin and, on the other hand, should not be less than ten per cent of the combined weight of the nitrostarch and resin. In the preferred embodiment of the invention, the proportion of nitrostarch to resin in compositions for use as top coat lacquers is that which gives films of breaking strength at least half of that given by compositions of the nitrostarch and resin of maximum strength characteristics and in no case below 50 kg. per sq. cm. as determined by the method hereinafter described. For other purposes, as for example for sanding base coats adapted to be abraded readily, the proportion of nitrostarch may be somewhat higher than the equal proportion mentioned above, but in general not above 60 per cent of the said combined weight.

Among the alkyd resins that may be used to advantage are the phthalic, maleic, succinic, sebacic, or like polycarboxylic acid esters of the polyhydric alcohols, as, for example, such esters of glycerol, pentaerythritol, dipentaerythritol, or mannitol. The polycarboxylic acid, for best results, should be of the aromatic series. In addition to the radical of the polycarboxylic acid, the resinous ester must include the acid radical of a drying oil, so as to make the said ester oxygen-convertible.

Among such acid radicals of drying oils that may be present in the oxygen-convertible ester are those derived from the drying or semi-drying oils, of which linseed, soya bean, China-wood, perilla, and corn oils are examples.

For some purposes, a portion only of the polycarboxylic or of the drying oil acid may be replaced by benzoic benzoic acid, abietic acid, acetyl salicyclic, or the like.

The invention will be illustrated by description in connection with the following specific examples.

Examples of alkyd resins that may be used are glycerol or preferably pentaerythritol esters such as the phthalate linoleate, phthalate linolenate, or mixtures thereof.

The resin desired may be made by conventional methods, from the polyhydric alcohol and acids (or their anhydrides) whose radicals are desired in the finished ester.

I use about 1 to 7 equivalents, preferably 3 equivalents of the drying oil acid to 3 equivalents of the other acidic material, as, for example, phthalic anhydride, the total of the two acidic substances being so proportioned ordinarily as to react with or esterify practically completely all the hydroxyl groups in the polyhydric alcohol. For some purposes, however, some of the hydroxyl groups may be left partly unreacted, so as to form hydroxy esters, particularly in case pentaerythritol, dipentaerythritol and mannitol are used as the polyhydric alcohol.

Some of the various types of resins that may be made in this manner and that are suitable for use with nitrostarch in my invention may be illustrated by the following structural chemical formulas. In these X represents the radical of a monocarboxylic acid of the kind described, that is, the molecule of the acid less the hydrogen from the carboxyl groups, and Y represents the radical derived similarly from a polycarboxylic acid.

Pentaerythritol esters

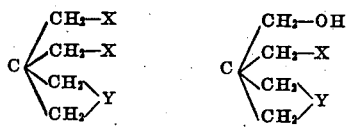

Dipentaerythritol esters

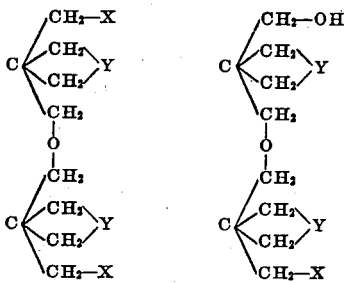

The proportion of the radicals X and Y, representing, respectively, the monocarboxylic acid and the polycarboxylic acid, may be varied, as stated above. It should be understood also, that the esterification may combine two or more molecules of the polyhydric alcohol in a single relatively complex molecule of the finished product.

The selected resin is preferably used in the lacquer in not fully hardened condition.

One such alkyd resin, the preferred one, may be made as follows:

18.5 parts of about 230° C. melting point pentaerythritol
54.7 parts of distilled linseed oil acids
26.8 parts of phthalic acid anhydride 100.0 parts total This mixture is heated to about 200° C. for about 6 hours, preferably with agitation, and in contact with an inert gas such as carbon dioxide. The water of reaction is vented off. The reaction product is a soft resinous material of good heat-convertible properties and found to be most desirable for very durable nitrostarch lacquers.

Proportions herein are expressed as parts or percentages by weight.

The nitrostarch used may be of various degrees of nitration, say from about 11 to 13.5 per cent nitrogen. It should pass the standard 100° C. stability test for 24 hours and should be soluble in usual lacquer solvents. The nitrostarch may be that made by conventional methods, from the starch of corn, potato, cassava, canna, or the like.

A suitable range of proportions of resin or mixture of resins to nitrostarch is 50 to 90 parts of resin to 100 parts of combined weight of resin and nitrostarch. For best results, however, the resin should be present in the proportion of 60 to 80 parts to 100 parts of the resin and nitrostarch.

In general, I use a proportion of resin in the lower part of these ranges when the resin has a pronounced softening effect upon the nitrostarch. Conversely, a larger proportion of resin is used when the resin has little softening effect upon the nitrostarch. The softer resins may be of the long-oil-length type, or of the medium-oil type if also of low convertibility, i. e., of tendency to harden to a rather small extent on oxidation. The harder resins, on the other hand, may be of the short-oil type. Or, they may be of the medium-oil type if of high convertibility. Also, the percentage of nitrostarch within the ranges stated will be larger when plasticizers are used.

Long, medium, and short oil-length resins herein referred to are those of the kind described containing drying oil acid radicals in the proportion of about two-thirds, one-half, and one-third, respectively, of the total weight of the resins. For the best films, from the standpoint of durability, the percentage of nitrostarch used on the weight of total film-forming ingredients (i. e., non-volatile soluble materials) should be about 60% to 80% of the percentage of oil acid radical in the resin; 70% of nitrostarch on the said proportion of oil acid radical is preferred. With resins of short-oil-length, the strength falls for proportions of nitrostarch above 20% of the combined weight of resin and nitrostarch. With long-oil resins, the strength falls when more than 40% of nitrostarch is used. These features are important in formulation.

Also, the alkyds, to be oxygen-convertible, should have an iodine value (Wijs) of 65 to about 135, preferably about 100. I have also found that for any given oil-length resin, the strength of the film varies directly with the iodine value of the oil acids used in making the alkyd.

As the active solvent material, there may be used a mixture of esters and alcohols, with or without ketones, glycol ethers, and similar volatile solvents. As the diluent, liquids such as toluol, xylol, or a moderately low boiling fraction of refined petroleum may be used.

A solvent medium richer than usual for pyroxylin lacquers is preferably used for solution of the film-forming ingredients. The active solvent material should constitute about 45 to 60 per cent, by volume, of the total solvent medium, the proportion selected depending somewhat upon the precipitation characteristics of the diluent used, in comparison with the efficacy of the active solvent material.

I prefer to use a somewhat higher proportion of high boiling material in my lacquer than is customary in the average pyroxylin lacquer. Thus, the diluent may contain a substantial proportion of xylol, and the active solvent material may contain an unusually high proportion of butyl acetate and butyl alcohol, or equivalent high boiling ingredients, to avoid the causing of blushing or precipitation by the xylol, as the solvent medium evaporates. A typical solvent medium may contain solvents and diluents in the following proportions:

*Typical solvent medium*

| Ingredients | Parts |
|---|---|
| Butyl acetate | 30 to 60 |
| Butyl ether of ethylene glycol | 2 to 5 |
| Butyl alcohol | 5 to 15 |
| Ethyl acetate | 2 to 5 |
| Xylol | 10 to 25 |
| Toluol | 10 to 20 |
| Petroleum lacquer diluent | 0 to 10 |

Pigments may be added, as desired, to produce colored compositions or enamels, as well as other admixtures that are conventional in lacquers and enamels. Thus, usual driers may be employed to accelerate the oxidation and attendant hardening of the resin.

Articles coated with lacquers and enamels made in accordance with this invention may be air-dried to evaporate solvent and harden the film. However, in certain cases, they are preferably heated in the presence of air to a moderately elevated temperature, say, to 85° to 120° C., to harden the film. In this heating the resin is converted (hardened rather readily) to the final condition. The period of heating is shorter, the higher the temperature. For most of the resins used with nitrostarch, heating of the lacquer film for several hours at 75° C. or 1 hour at 120° C. is satisfactory. The heat treatment required is less for the relatively rapidly converting resins and greater for the more slowly converting. In general, the heating is discontinued when the degree of hardening obtained adapts the film to withstand properly the conditions under which it is to be used.

With the resins of the kind described for use with nitrostarch, there is formed a film of greater breaking strength than a corresponding film from which either the selected resin or nitrostarch is omitted. In other words, the strength of the blend of the resin of special kind and nitrostarch in the lacquer film is greater than the strength of either of its principal components. Film strength is especially high for a resin content within the range of 60 to 80 per cent of the total weight of resin and nitrostarch. Using 60 to 70 parts of resin, for example, and 0 to 15 parts of a liquid plasticizer for 100 parts of combined weight of nitrostarch, resin, and plasticizers if any, I have formed lacquer films having, in hardened condition, strengths in excess of 50 kg. and usually 100 to 300 kg., per square cm. of cross section of the film tested. My preferred lacquer compositions have film strength above 200 kg., per square cm. Also, I have found that, in general, films of the kind described and of strength in excess of 50 kg., are more satisfactory in durability, than films of standard pyroxylin lacquers now on the market, and that my films of higher strength, say, in excess of 200 kg., are remarkably durable.

The method of testing the tensile strength, by which method the above data have been obtained, is designed to give the most reliable results with lacquers containing nitrostarch and the oxygen-convertible alkyds. There is poured on a glass plate, within an adhered frame with central portion cut out over an area 6 by 6 inches, 20 cc. lacquer of 15% solids content, adequate to form, within the cut out portion of the frame, a final lacquer film approximately 0.0035 inch thick. The poured lacquer is allowed to dry for six to eight hours at atmospheric temperature and then is warmed for 15 hours at 85° C. The dried film is cut, while still adhered to the plate, into test strips each 1 by 3.5 inches. The glass plate and cut film are immersed in warm water for a few hours to loosen the film. The test strips are then removed from the glass and allowed to age in air for 3 days. Finally, they are tested for breaking strength in a Scott tensile testing machine, the test strips being calipered and the tensile strength calculated as kg. per square cm. of cross section.

Using this method of testing, I have found that tensile strength of the films falls sharply after the nitrostarch reaches a certain proportion, as shown by the following data:

| | Resin present | |
|---|---|---|
| Resin, percent of combined weight of resin and nitrostarch | Ester of pentaerythritol with phthalic anhydride and linseed oil acids (50% oil-length) | Ester of glycerol with phthalic anhydride and linseed oil acids (54% oil-length) |
| | Kg./sq. cm. | Kg./sq. cm. |
| 100 | 80 | 0 |
| 90 | 170 | 12 |
| 80 | 200 | 150 |
| 70 | 220 | 200 |
| 60 | 250 | 107 |
| 50 | 120 | 55 |
| 40 | 0 | 0 |
| 30 | 0 | 0 |

In the above table, "0" indicates practically no strength, or, more specifically, strength so low as not to register properly on the testing machine.

It will be evident from the table that strength of film decreases when the proportion of resin of medium oil-length falls below 60% to 70% of the combined weight of resin and nitrostarch and decreases rapidly when the proportion of resin is less than 50%.

Mixtures of about one-third nitrostarch with two-thirds alkyds, giving strong films at this concentration of nitrostarch, were found to be doubly critical, in that below this proportion of nitrostarch the films tend to air-dry slowly, whereas above this amount of nitrostarch the finishes are less durable.

Typical proportions of nitrostarch and the several resins that give very strong and durable films are shown below, the resins being indicated by the materials from which they are made.

| Resin | Percentage of resin on weight of resin and nitrostarch |
|---|---|
| Pentaerythritol, phthalic anhydride and linseed oil acids.* | 68 |
| Glycerol, phthalic acid, and linseed oil acids (medium oil type). | 60 |
| Glycerol, phthalic acid, and linseed oil acids (short oil type). | 76 |

*Ester resulting from reacting 1 mol of pentaerythritol with 1.5 mols of phthalic anhydride and 1 mol of linseed oil acids.

The preferred use of my strong nitrostarch alkyd mixtures is for coating compositions. Several lacquer formulas are given below.

FORMULA 1.—*Automobile finish*

| | Parts by weight |
|---|---|
| Nitrostarch | 13 |
| Ester of pentaerythritol with phthalic anhydride and linseed oil acids (medium oil length) | 26 |
| Prussian blue | 4 |
| Chrome yellow | 2 |
| Butyl acetate | 30 |
| Toluol | 25 |
| Total | 100 |

FORMULA 2.—*Furniture finish*

| | |
|---|---|
| Nitrostarch | 15.2 |
| Oxygen-convertible alkyd dry weight | 19.8 |
| Tricresyl phosphate | 3.0 |
| Volatile lacquer solvent | 62.0 |
| Total | 100.0 |

FORMULA 3.—*Flexible finish*

| | |
|---|---|
| Nitrostarch | 7. |
| Oxygen-convertible alkyd dry weight | 28. |
| Metallic drier figured as metal | 0.015 |
| Cobalt blue | 4. |
| Titanium dioxide | 6. |
| Organic solvent | 55. |

In the finishes of the present invention there are a number of features of advantage over the conventional pyroxylin lacquers.

One such advantage is the previously mentioned lower cost of nitrostarch per pound, as compared to the cost of pyroxylin.

In addition, it is possible to apply to an article a film of desired thickness with a smaller number of coats of my lacquer than are necessary with standard pyroxylin lacquers of satisfactory quality. In a solvent medium of the type of the compositions above described, it is possible, for example, to dissolve as much as 70 per cent of the film-forming ingredients on the total weight of the solution. In fact, my improved lacquer may be sprayed in the concentration of 30 parts to 55 parts of film-forming ingredients for 100 parts of total weight of the lacquer. The orange peel and surface roughness that ordinarily accompany the use of excessively concentrated lacquer is not appreciably more conspicuous, if indeed it is as conspicuous, when my highly concentrated lacquer is used, as with pyroxylin lacquers of the usual, much lower concentration. With such a highly concentrated lacquer, there is a large saving not only in volume of solvent medium required to provide a lacquer film of desired thickness, but also in the period of time and the amount of labor required to apply and polish the material.

Another advantage is the combination of the speed of setting of lacquer with the durability and high solids content of synthetics.

Lacquers made as described dry rapidly, the nitrostarch being very effective in facilitating solvent removal from what would otherwise be a tacky resin film. Typical lacquers made as described are print-free when a canvas disc of 1½ in. diameter area is pressed thereagainst by a force of 450 g.

Lacquer films made with my improved compositions possess the advantage, also, of being easily rubbed to a polished surface finish.

Further, they have been found, in tests of a number of typical formulas, to be more durable than pyroxylin lacquers of comparable formulas. Thus, there has been found less rusting of steel when protected by the nitrostarch-resin films than when protected by films from various commercially important pyroxylin lacquers. Also, the nitrostarch and resin films do not check or crack on outdoor exposure as readily as conventional pyroxylin lacquer films.

Tests on the nitrostarch-resin films have shown, in addition, exceptionally good non-lifting properties and adherence to the surfaces of various articles.

I have discovered also that I may use, as the resin in durable nitrostarch compositions, an alkyd-modified urea-aldehyde resin, as, for example, one made from glycerol, phthalic anhydride, urea, and formaldehyde. Such a resin may be made to advantage as described by Hodgins and Hovey, Industrial and Engineering Chemistry, volume 30, pp. 1026–7, 1938. A suitable resin of the alkyd type modified by urea-aldehyde is sold under the trade name "Beetle 592–8."

This type of resin has a softening effect upon nitrostarch similar to that of the oxygen-convertible alkyds. Also, the alkyd-modified urea-aldehyde resins are heat-convertible at temperatures of approximately 120° C. or lower. They give unusually clear nitrostarch lacquers and films of good color retention, on aging or warming.

Suitable mixtures with nitrostarch are those comprising about 2 parts of nitrostarch to 3 parts resin. A water-white strong nitrostarch coating composition may be made as follows:

FORMULA 4.—*Alkyd-modified urea-aldehyde finish*

| | Parts by weight |
|---|---|
| Nitrostarch | 11.5 |
| "Beetle 592–8" (dry weight) | 16.5 |
| Tricresylphosphate | 5.0 |
| Volatile organic solvent | 67.0 |
| Total | 100.0 |

Also, desirable films may be made from nitrostarch lacquers including, as the resin, a mixture of an oxygen-convertible alkyd, with a urea-aldehyde resin. This mixture imparts color retention to a nitrostarch lacquer or film, so as to decrease discoloration.

It gives films of high strength, particularly, when the urea-aldehyde resin, the alkyd, and nitrostarch are present in about equal proportions.

In determining the proper proportion of resin to nitrostarch in compositions including the urea-aldehyde resins, these resins may be assumed to require, for best results as to strength, the same percentage of nitrostarch on the combined weight of nitrostarch and resin as do the oxygen-convertible alkyds.

Other admixtures may be substituted for a part of the convertible resins described, so long as the admixture is compatible, the remaining convertible resin constitutes about a third or more of the total film, and the proportion of nitrostarch is not greater than half of the said film. Among such admixtures that may be used are the fatty oils, dammar resin, and toluene sulfonamides.

Compositions of the kind described are useful also in adhesives, plastics and linoleum.

The details that have been given are for the purpose of illustration, not restriction. It is intended, therefore, that variations within the spirit of the invention should be included in the scope of the appended claims.

I claim:

1. A composition of matter comprising nitrostarch and an alkyd resin characterized by being hardenable in air at a temperature below 120° C., the resin being present in the proportion of about 50 to 90 parts for 100 parts of combined weight of nitrostarch and resin, the said resin having an iodine number of approximately 65 to 135 and including an ester of a polyhydric alcohol with a polycarboxylic acid and drying oil fatty acid and the drying oil fatty acid represented being in the proportion of about 1 to 7 equivalent proportions for 3 of the polycarboxylic acid.

2. A composition of matter comprising nitrostarch and an alkyd resin characterized by being hardenable in air at a temperature below 120° C., the resin being present in the proportion of about 50 to 90 parts for 100 parts of combined weight of nitrostarch and resin, the said resin having an iodine number of approximately 65 to 135 and including an ester of a polyhydric alcohol with a polycarboxylic acid and drying oil fatty acid and the percentage of nitrostarch on the combined weight of nitrostarch and resin being about 60 to 80 per cent of the percentage of drying oil fatty acid in the said resin.

3. A composition as described in claim 1, the polyhydric alcohol used being pentaerythritol.

4. A lacquer comprising the composition described in claim 1 and a volatile solvent medium for the nitrostarch and resin.

5. A composition of matter as described in claim 1, the drying oil fatty acid represented being in the proportion of about 3 equivalent proportions for 3 equivalent proportions of the polycarboxylic acid.

WALTER D. BOWLBY.

CERTIFICATE OF CORRECTION.

Patent No. 2,279,438.　　　　　　　　　　　April 14, 1942.

WALTER D. BOWLBY.

It is hereby certified that error appears in the printed specification of the above numbered patent requiring correction as follows: Page 3, second column, line 53, in the heading to the table, for "50%" read --54%--; and that the said Letters Patent should be read with this correction therein that the same may conform to the record of the case in the Patent Office.

Signed and sealed this 10th day of November, A. D. 1942.

(Seal)

Henry Van Arsdale,
Acting Commissioner of Patents.